(12) United States Patent
Sakai

(10) Patent No.: US 8,034,497 B2
(45) Date of Patent: Oct. 11, 2011

(54) CONTROL DEVICE OF VEHICULAR FUEL CELL SYSTEM AND RELATED METHOD

(75) Inventor: Hiromasa Sakai, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 864 days.

(21) Appl. No.: 10/550,512

(22) PCT Filed: Feb. 27, 2004

(86) PCT No.: PCT/JP2004/002444
§ 371 (c)(1),
(2), (4) Date: Sep. 23, 2005

(87) PCT Pub. No.: WO2004/086545
PCT Pub. Date: Oct. 7, 2004

(65) Prior Publication Data
US 2006/0234094 A1 Oct. 19, 2006

(30) Foreign Application Priority Data
Mar. 27, 2003 (JP) .................................. 2003-089089

(51) Int. Cl.
*H01M 8/04* (2006.01)
*G05D 11/00* (2006.01)
*B60L 11/18* (2006.01)

(52) U.S. Cl. ........ 429/429; 429/400; 429/428; 429/430; 429/431; 429/432; 429/433; 700/286

(58) Field of Classification Search .................... 429/12, 429/400, 428–433
See application file for complete search history.

(56) References Cited

U.S. PATENT DOCUMENTS

| 7,083,017 | B2 | 8/2006 | Hasuka et al. | |
|---|---|---|---|---|
| 2002/0051899 | A1* | 5/2002 | Keskula et al. | 429/17 |
| 2002/0094467 | A1 | 7/2002 | Nonobe et al. | |
| 2002/0095247 | A1 | 7/2002 | Ding et al. | |
| 2002/0134239 | A1* | 9/2002 | Tang et al. | 95/90 |
| 2002/0146602 | A1 | 10/2002 | Abe et al. | |
| 2002/0192519 | A1* | 12/2002 | Fujita et al. | 429/23 |
| 2003/0039873 | A1* | 2/2003 | Condit et al. | 429/26 |
| 2003/0134239 | A1* | 7/2003 | Beutel et al. | 431/7 |

(Continued)

FOREIGN PATENT DOCUMENTS
EP 0 920 064 A1 6/1999
(Continued)

*Primary Examiner* — Ula C. Ruddock
*Assistant Examiner* — Amanda Barrow
(74) *Attorney, Agent, or Firm* — Foley & Lardner LLP

(57) ABSTRACT

A control device for a vehicular fuel cell system is provided with a warm-up output control section operative, when a fuel cell system is started up under a low temperature condition and in case that a fuel cell stack of the fuel cell system is warmed up, causing the fuel cell stack to generate electric power to allow predetermined warm-up electric power to be taken out, and a run permission section operative, during a period wherein the warm-up electric power is drawn by the warm-up output control section, to determine whether the fuel cell stack assumes a predetermined warm-up condition on the basis of one of a voltage value and an electric current value of the fuel cell stack. When a determination is made that the fuel cell stack assumes the predetermined warm-up condition, the run permission section provides a vehicle with run permission.

7 Claims, 9 Drawing Sheets

U.S. PATENT DOCUMENTS

2003/0235730 A1 * 12/2003 Noetzel et al. ................. 429/23
2004/0005487 A1 *  1/2004 Matoba ........................... 429/22

FOREIGN PATENT DOCUMENTS

| | | | |
|---|---|---|---|
| JP | 09-231991 A | | 9/1997 |
| JP | 2002-134150 | * | 5/2002 |
| JP | 2002-134150 A | | 5/2002 |
| JP | 2002-134150 A | * | 5/2002 |
| JP | 2002134150 A | * | 5/2002 |
| JP | 2002-305013 A | | 10/2002 |
| JP | 2002-313388 A | | 10/2002 |
| JP | 2004-030979 A | | 1/2004 |
| JP | 2004-180455 A | | 6/2004 |

* cited by examiner

CONTROL DEVICE OF VEHICULAR FUEL CELL SYSTEM AND RELATED METHOD

TECHNICAL FIELD

The present invention relates to a control device of vehicular fuel cell system and a related method and, more particularly, to a control device of a vehicular fuel cell system that permits a fuel cell stack to generate electric power at less power than a rated electric power during start-up at a low temperature condition, thereby warming up the fuel cell system, and a related method.

BACKGROUND

Japanese Patent Application Laid-Open Publication No. 2002-305013 discloses a vehicular fuel cell system which, during start-up of a vehicle at a low temperature condition such as a below-freezing temperature, permits a fuel cell stack to generate electric power at a predetermined power to achieve warm-up of a fuel cell prior to commencement to travel the vehicle, and which discriminates to find whether the warm-up of the fuel cell stack has been completed, referring to an air electrode (cathode) exhaust gas temperature, a temperature difference between an air electrode intake air and an air electrode exhaust, and a temperature factor such as a temperature of coolant, thereby providing the vehicle with a run permission (see FIG. 3 and its related description).

SUMMARY OF INVENTION

However, upon careful studies conducted by the present inventors, in such a vehicular fuel cell system, because a fuel cell stack larger than that of a domestic electric power supply is provided to supply a vehicle drive electric power, a result is an increase in an uneven temperature distribution between a central stack portion and a terminal stack portion. It is conceivable that, depending upon conditions, such as an output of the fuel cell stack, occurring during an initial stage of start-up and at warm-up completion, it is difficult to correctly determine, based on only a temperature factor, whether a warm-up of the fuel cell stack has been completed.

Further, although it is conceivable to use a structure wherein a determination is made whether the warm-up has been completed using a highly accurate temperature sensor, because such a structure needs to make a determination on the basis of an increased temperature value, while considering safety in the presence of an unevenness in temperature values, detected by the temperature sensor, a tendency tends to occur in which time, energy, and the amount of fuel consumed during warm-up, which are needed before making a judgment whether warm-up has been completed, energy and the amount of fuel consumed during warm-up increase.

The present invention has been completed upon such studies conducted by the present inventors and, specifically, has an object to provide a control device for a vehicular fuel cell system and its related method that enable a time needed before making judgment to find whether warm-up has been completed to be minimized and the energy required for warm-up to be saved to thereby improve fuel saving performance of a fuel cell powered vehicle.

To achieve the above object, according to one aspect of the present invention, a control device of a vehicular fuel cell system includes: a warm-up output control section operative, when a fuel cell system is started up under a low temperature condition and in case that a fuel cell stack of the fuel cell system is warmed up, causing the fuel cell stack to generate electric power to allow predetermined warm-up electric power to be drawn; and a run permission section operative, during a period wherein the warm-up electric power is drawn by the warm-up output control section, to discriminate whether the fuel cell stack assumes a predetermined warm-up condition on the basis of one of a voltage value and an electric current value of the fuel cell stack, whereby when discrimination is made that the fuel cell stack assumes the predetermined warm-up condition, the run permission section provides a vehicle with run permission.

Stated in another way, according to another aspect of the present invention, a control device of a vehicular fuel cell system includes: a warm-up output controlling means, when a fuel cell system is started up under a low temperature condition and in case that a fuel cell stack of the fuel cell system is warmed up, for controlling the fuel cell stack to generate electric power to allow predetermined warm-up electric power to be drawn; and a run permission providing means, while discriminating whether the fuel cell stack assumes a predetermined warm-up condition on the basis of one of a voltage value and an electric current value of the fuel cell stack during a period wherein the warm-up electric power is drawn by the warm-up output controlling means, for providing a vehicle with run permission when discrimination is made that the fuel cell stack assumes the predetermined warm-up condition.

On the other hand, according to another aspect of the present invention, a method of controlling a vehicular fuel cell system, the method includes the steps of: taking out predetermined warm-up electric power by controlling the fuel cell stack to generate electric power, when a fuel cell system is started up under a low temperature condition and in case that a fuel cell stack of the fuel cell system is warmed up; and providing a vehicle with run permission when discrimination is made that the fuel cell stack assumes a predetermined warm-up condition, while discriminating whether the fuel cell stack assumes the predetermined warm-up condition on the basis of one of a voltage value and an electric current value of the fuel cell stack during a period wherein the warm-up electric power is drawn.

Other and further features, advantages, and benefits of the present invention will become more apparent from the following description taken in conjunction with the following drawings.

DETAILED DESCRIPTION

A controller device for a vehicular fuel cell system and its related method of each of various embodiments according to the present invention are described in detail herein with suitable reference to the accompanying drawings.

First Embodiment

First, referring to FIGS. 1 to 7, a control device of a vehicular fuel cell system and its related method of a first embodiment according to the present invention are described below in detail.

Figure 1:
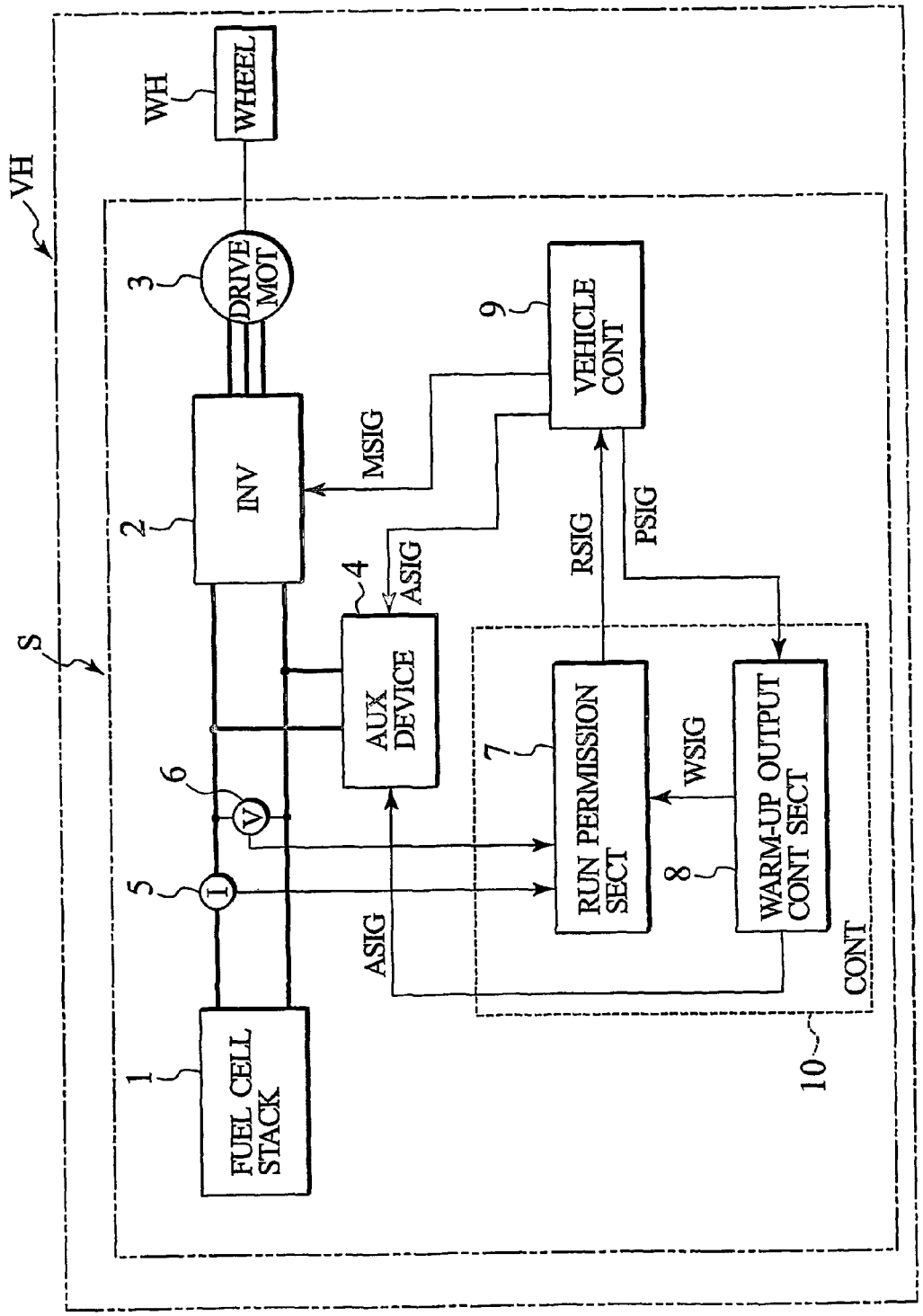
FIG. 1 is a block diagram illustrating a schematic structure of a vehicular fuel cell system of a first embodiment according to the present invention.

FIG. 1 is a block diagram showing a schematic structure of the vehicular fuel cell system of the presently filed embodiment.

In FIG. 1, the vehicular fuel cell system S can include a fuel cell stack 1 that is supplied with fuel gas (hydrogen containing gas) and air (oxygen containing gas) to generate electric power, an inverter 2 converting DC power delivered from the fuel cell stack 1 to AC power, a drive motor 3 supplied with AC power from the inverter 2 to drive wheels WH of a vehicle VH, an auxiliary device 4 that supplies the fuel cell stack 1 with air and coolant, an ammeter 5 that detects electric current of electric power generated by the fuel cell stack 1, a voltmeter 6 that detects voltage of electric power generated by the fuel cell stack 1, and a vehicle controller 9 that allows the vehicle to travel depending upon a run permission provided by a control device 10.

The control device 10 is comprised of a warm-up output control section 8 operative to cause the fuel cell stack 1 to generate electric power to allow warm-up electric power to be drawn at a predetermined amount during start-up of the fuel cell stack 1 under a low temperature condition, and a run permission section 7 that provides the vehicle controller 9 with run permission in case that it is determined that the fuel cell stack 1 has reached a predetermined warmed up condition, based on detected values resulting from the ammeter 5 and the voltmeter 6 when warm up output is drawn at a predetermined amount by the warm-up output control section 8. In particular, the run permission section 7 sends a run permission signal RSIG to the vehicle controller 9; the warm-up output control section 8 sends a warm-up start signal WSIG to the run permission section 7 and an auxiliary drive signal ASIG (A1SIG and A2SIG in FIG. 3) to the auxiliary unit 4; and the vehicle controller 9 sends a motor drive signal MSIG to the inverter 2 and a vehicle demanded power signal PSIG to the warm-up output control section 8. Also, the auxiliary device 4 is supplied with an auxiliary device drive signal ASIG (A3SIG and A4SIG in FIG. 3) from the vehicle controller 9.

Structure of Vehicular Fuel Cell System

Figure 2:
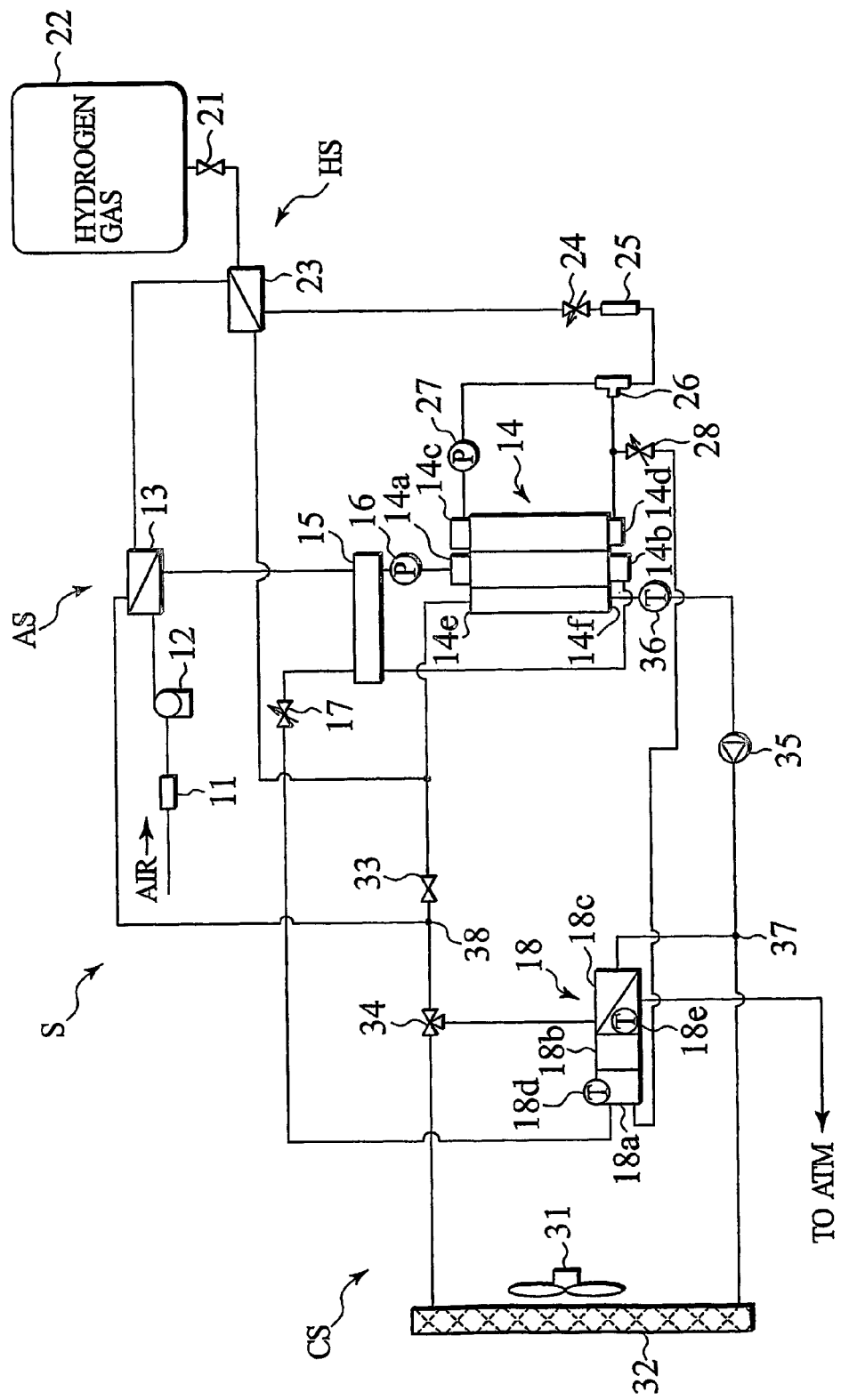
FIG. 2 is a system structural view illustrating a further concrete structure of the fuel cell system of the presently filed embodiment.
Figure 3:
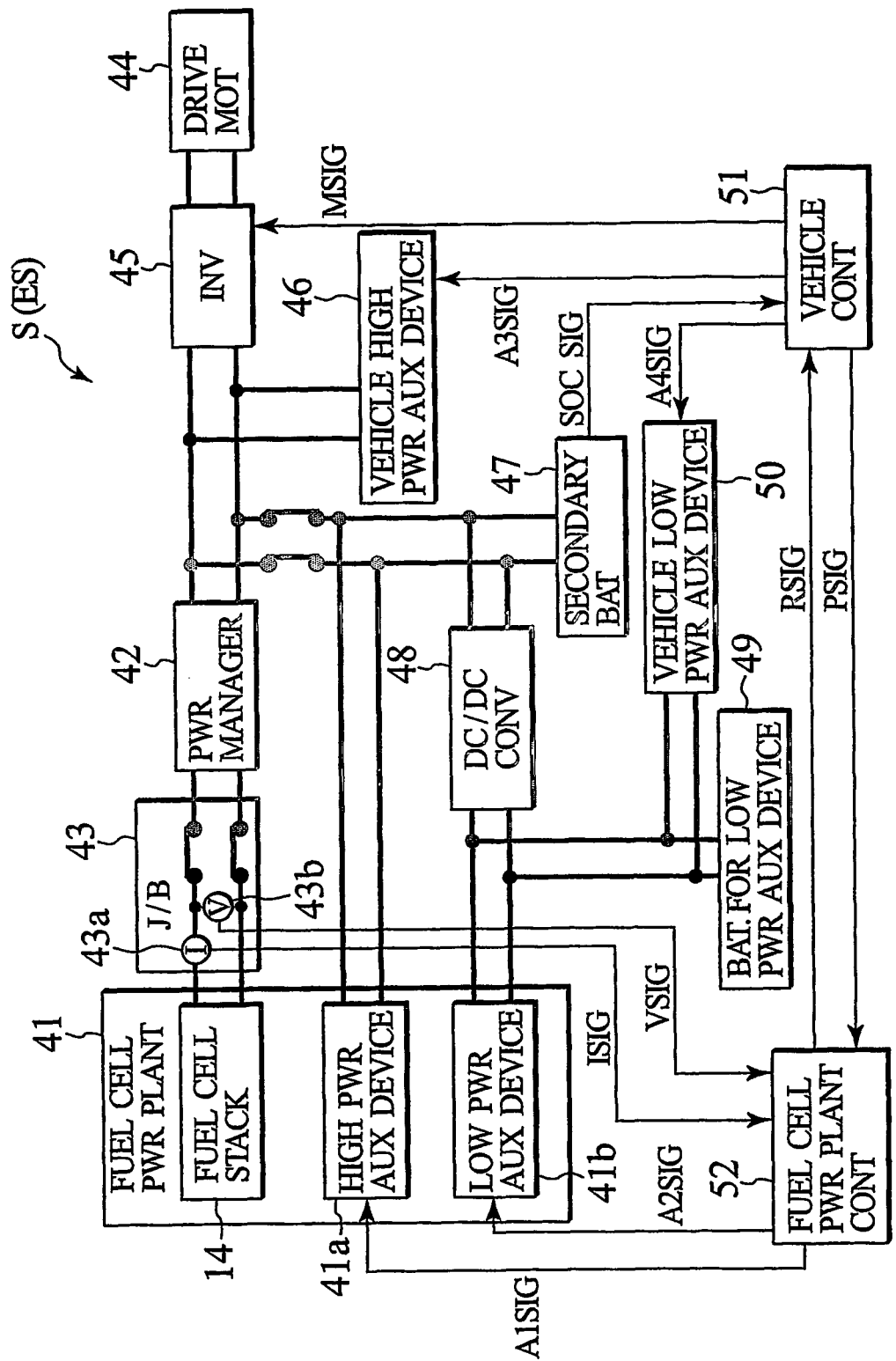
FIG. 3 is a block diagram illustrating a structure of an electrical system of the fuel cell system shown in FIG. 2.

Now, referring to FIGS. 2 and 3, a structure of the vehicular fuel cell system to which such a control device 10 is applied is described in detail.

The fuel cell system generally can include an air system through which air is supplied to the fuel cell stack, a hydrogen system through which hydrogen gas is supplied to the fuel cell stack, a coolant system by which the fuel cell stack is cooled, and an electrical system through which operation of the system is controlled. Therefore, hereinafter, the structure of the fuel cell system is described in detail for each system.

FIG. 2 is a system structural view illustrating a further structure of the fuel cell system of the presently embodiment, and FIG. 3 is a block diagram illustrating a structure of the electrical system of the fuel cell system shown in FIG. 2.

Structure of Air System

As shown in FIG. 2, the air system AS includes a compressor 12 that compresses air that is drawn through a flow meter 11, an air temperature regulator 13 that regulates the temperature of compressed air, and a moisture exchanger unit 15 operative to humidify air at a regulated temperature and to supply the air to an air electrode (cathode) supply manifold 14a of the fuel cell stack 14 (corresponding to the fuel cell 1 shown in FIG. 1).

Here, the moisture exchanger unit 15 removes moisture from air discharged from an air electrode output manifold 14b of the fuel cell stack 14 and allows recovered moisture to be added to air being supplied to the air electrode. Also, disposed between the air electrode supply manifold 14a and the moisture exchanger unit 15 is a pressure sensor 16 by which the pressure of air being supplied to the fuel cell stack 14 is measured.

Further, the air system includes a pressure control valve 17 that is connected to an off-gas supply port of the moisture exchanger unit 15 and regulates the pressure of air discharged from the air electrode outlet manifold 14b of the fuel cell stack 14. Air, whose pressure is regulated with the pressure control valve 17, is introduced to a combustor 18, wherein air and anode off-gas, which is separately introduced, combust and exhaust gases are expelled to the atmosphere.

Moreover, the combustor 18 can include an electric-heated catalyst section 18a that is heated to a catalyst activity temperature with electrical heat, a catalytic combustor section 18b that enables combustion of anode off-gas and air, and a heat exchanger 18c that allows combustion heat to be transferred to coolant, and the electric-heated catalyst section 18a, with the electric-heated catalyst section 18a and the catalytic combustor section 18b incorporating temperature sensors 18d, 18e for detecting temperatures, respectively.

Structure of Hydrogen System

As shown in FIG. 2, the hydrogen system HS can include a hydrogen temperature regulator 23 for regulating the temperature of hydrogen gas being supplied from a hydrogen tank 22 through a shut-off valve 21, a pressure regulator valve 24 for regulating the pressure of hydrogen gas with regulated temperature, and an ejector 26 for supplying a hydrogen electrode (anode) supply manifold 14c of the fuel cell stack 14 with hydrogen gas supplied from the pressure regulator valve 24 through the flow meter 25.

Here, disposed between the hydrogen electrode supply manifold 14c and the ejector 26, is a pressure sensor 27 for measuring the pressure of hydrogen gas to be supplied to the fuel cell stack 14. Also, hydrogen gas discharged from the hydrogen electrode outlet manifold 14d of the fuel cell stack 14 is returned to the ejector 26 again and mixed with hydrogen gas supplied through the flow meter 25, with the resulting mixture being supplied again to the fuel cell stack 14.

Further, disposed between a hydrogen electrode outlet manifold 14d and the ejector 26 is a branch passage in which a purge valve 28 is disposed for permitting anode gas, containing impurities such as nitrogen, to be purged. Hydrogen gas purged from the purge valve 28 is combusted in the combustor 18, and combustion gases are exhausted to the atmosphere.

Structure of Coolant System

As shown in FIG. 2, the coolant system CS can include a radiator 32 having a fan 31 adapted to be rotationally driven to cool coolant, a three-way valve 34 arranged to supply coolant to a coolant inlet manifold 14e of the fuel cell stack 14 through a shut-off valve 33, a coolant pump 35 by which coolant, discharged from coolant outlet manifold 14f of the fuel cell stack 14, can be circulated, and a temperature sensor 36 for measuring the temperature Tso [° C.] of coolant discharged from the coolant outlet manifold 14f.

Here, the three-way valve 34 is enabled to control the flow rate of coolant that is branched off at a branch point 37 in a direction toward the radiator 32 and in a direction toward a heat exchanger 18c. Also, the three-way valve 34 is enabled to supply coolant to the air temperature regulator 13 and the hydrogen temperature regulator 23 via a branch point 38.

Structure of Electrical System

As shown in FIG. 3, the electrical system ES includes a fuel cell power plant 41, which is comprised of the fuel cell stack 14, a high power auxiliary device 41a, such as an inverter for the compressor, and a low power auxiliary device 41b.

Further, the electrical system includes a junction box (JB) 43 that provides electric power from the fuel cell stack 14 to a power manager 42, the junction box 43 including a current sensor 43a and a voltage sensor 43b which detects electric current (hereinafter referred to as stack current) Is [A] of the fuel cell stack 14 and a voltage (hereinafter referred to as stack voltage) Vs [V], respectively.

Here, the power manager 42 serves to allow electric power, delivered from the junction box 43, to be supplied to an inverter 45 (corresponding to an inverter 1 in FIG. 1) for a drive motor 44 (corresponding to the drive motor 33 in FIG. 3) of the vehicle, a vehicle high power auxiliary device 46 such as an air conditioner system, a secondary battery 47 and the high power auxiliary device 41a.

Further, the power manager 42 renders a DC/DC converter 48 to step down in voltage of electric power, supplied from the junction box 43, and permits resulting electric power to be supplied to the low power auxiliary device 41b, a low power battery 49 for the low power auxiliary device, and a vehicle weak current auxiliary device 50. Also, the current sensor 43a and the voltage sensor 43b correspond to the ammeter 5 and the voltmeter 6, respectively, in FIG. 1.

Furthermore, the electrical system also includes a fuel cell power plant controller 52 (corresponding to the control device 1 in FIG. 1) that is responsive to stack current Is, stack voltage Vs and the vehicle demanded power signal PSIG, which is inputted from a vehicle controller 51 (corresponding to the vehicle controller 9 in FIG. 1), and applies the drive signals to the high power auxiliary device 41a and the low power auxiliary device 41b while inputting the run permission signal RSIG to the vehicle controller 51. Here, the vehicle controller 51 is responsive to the run permission signal RSIG to allow the drive signals to be inputted to the inverter 45, the vehicle high power auxiliary device 46 and the vehicle weak current auxiliary device 50.

Moreover, the vehicle controller 51 serves to generate the vehicle demanded power signal PSIG, representative of a demanded electric power, referring to an SOC signal, indicative of a charged status of the battery, which is outputted from the secondary battery 47.

Also, the above-described auxiliary devices 41a, 41b, 46, 50 correspond the auxiliary device 4 shown in FIG. 1.

Besides, the current sensor 43a transmits a stack current signal ISIG, representative of electric current flowing through the fuel cell stack 14, to the fuel cell power plant controller 52, to which a stack voltage signal VSIG, representative of output voltage of the fuel cell stack 14, is applied from the voltage sensor 43b. The secondary battery 47 applies the SOC signal SOCSIG, representative of resulting SOC, to the vehicle controller 51. The vehicle controller 51 delivers the motor drive signal MSIG to the inverter 45, the vehicle demanded power signal PSIG to the fuel cell power plant controller 52, the drive signal A3SIG to the vehicle high power auxiliary device 46 and the drive signal A4SIG to the vehicle weak current auxiliary device 50. The fuel cell power plant controller 52 is operative to apply the run permission signal RSIG to the vehicle controller 51, the drive signal A1SIG to the high power auxiliary device 41a and the drive signal A2SIG to the low power auxiliary device 41b.

Operation of Vehicular Fuel Cell System

Now, referring to FIGS. 4 to 10, description is made of how the vehicular fuel cell system S with the structure set forth above operates during start-up.

Figure 4:
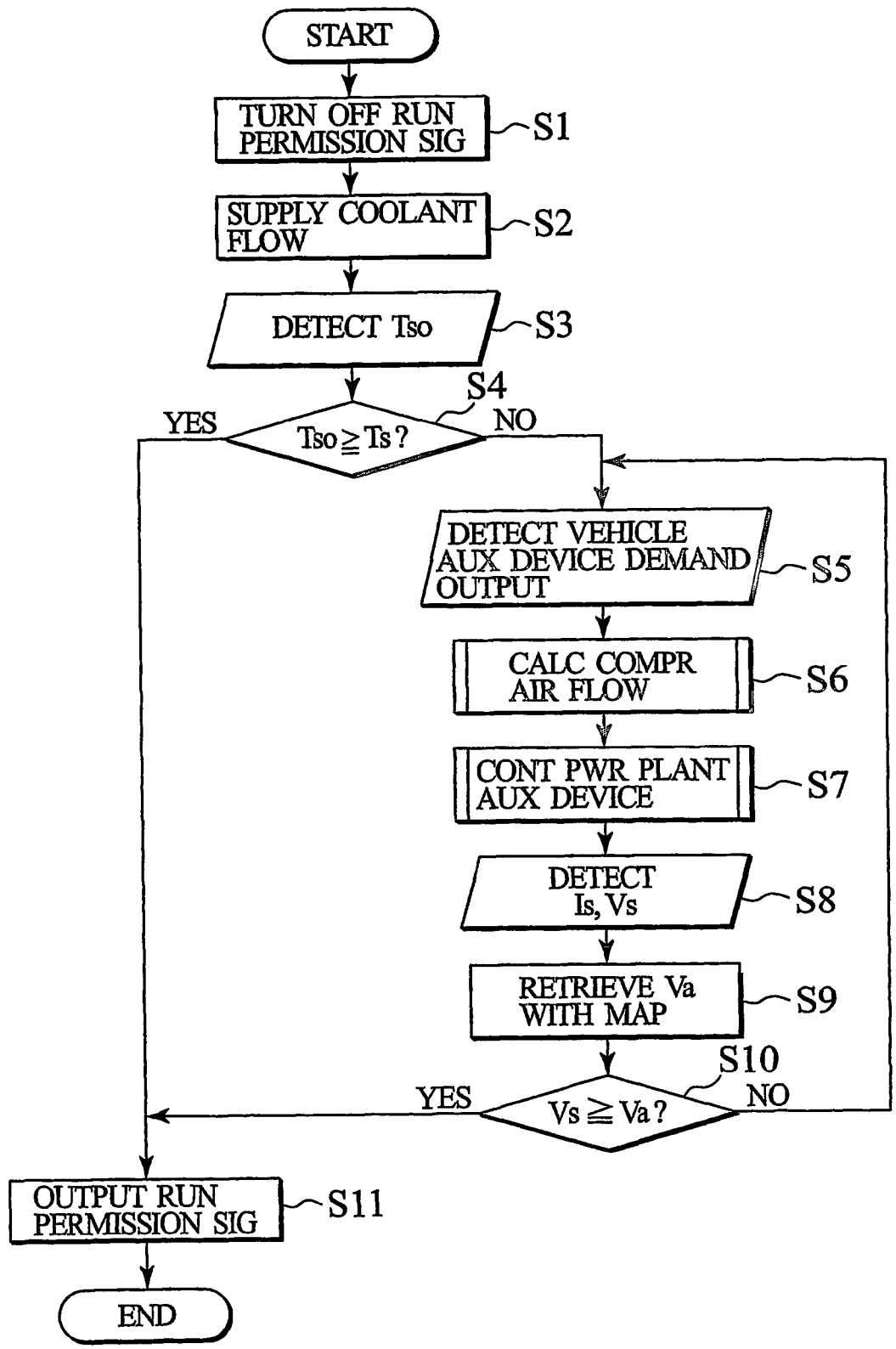
FIG. 4 is a flowchart illustrating a sequence of flows in start-up operation to be executed by a control device of the fuel cell system of the presently filed embodiment.
Figure 5:
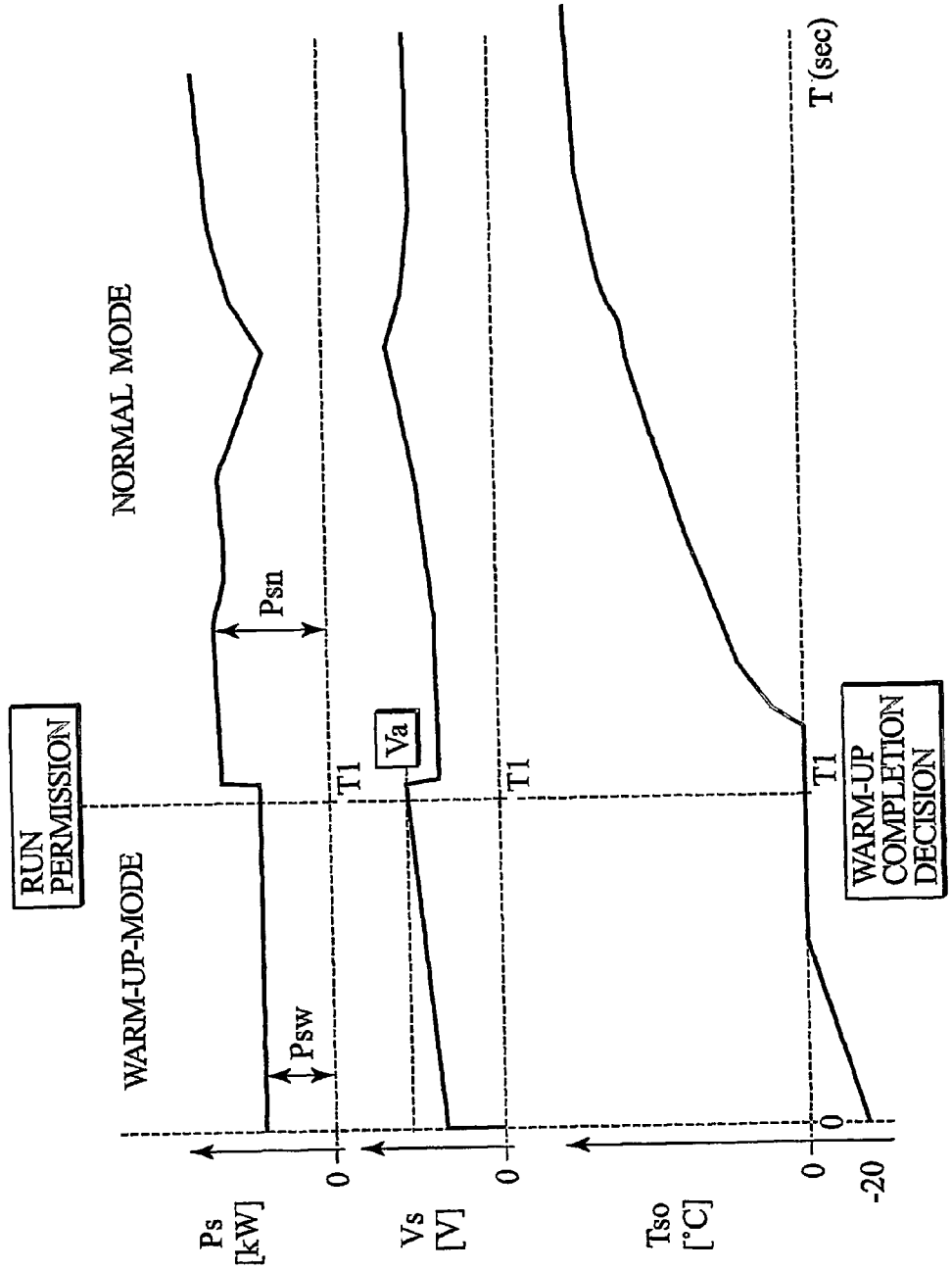
FIG. 5 is a timing chart illustrating variations in time of stack output, stack voltage, and coolant temperature during execution of start-up operation shown in FIG. 4.
Figure 6:
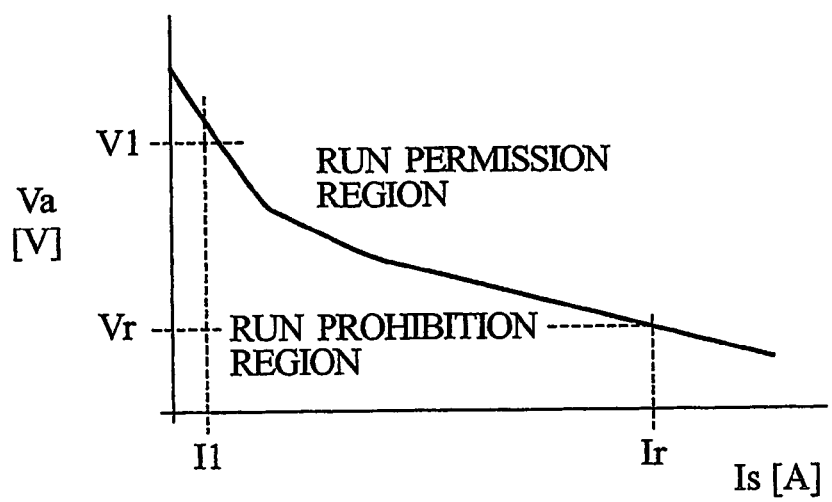
FIG. 6 is a view illustrating the relationship between stack current and run available voltage of the presently filed embodiment.
Figure 7:
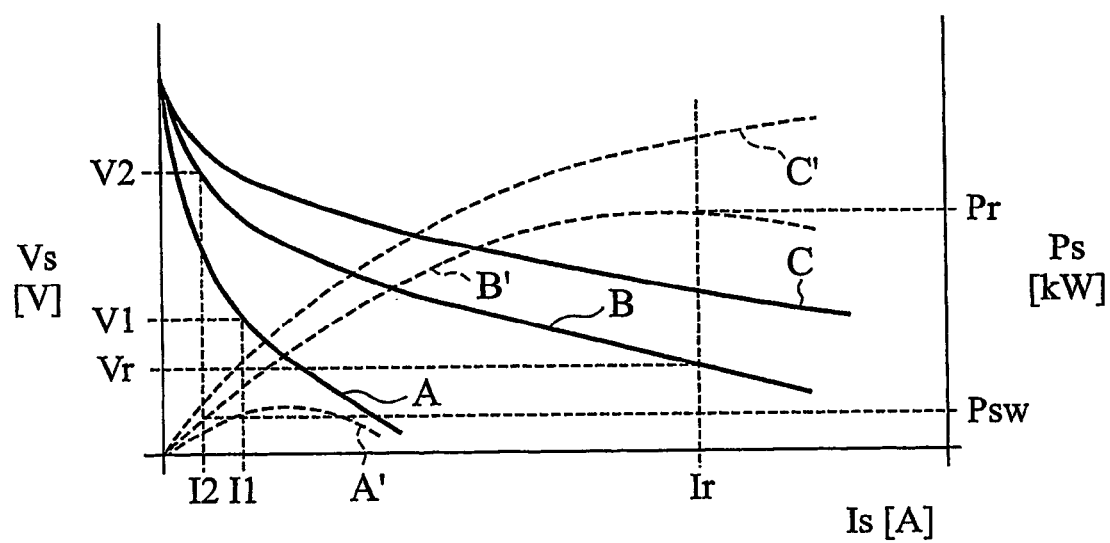
FIG. 7 is a view illustrating current/voltage characteristics of the fuel cell stack accompanied by warm-up operation, and current/stack-output characteristics associated with respective current/voltage characteristics of the presently filed embodiment.

FIG. 4 is a flowchart illustrating the flow of start-up operation of the control device of the fuel cell system of the presently filed embodiment, FIG. 5 is a timing diagram illustrating changes in time of stack output, stack voltage and coolant temperature during start-up operation being executed as shown in FIG. 4, FIG. 6 is a view illustrating the relationship between stack current and run available voltage of the presently filed embodiment, and FIG. 7 is a view illustrating current/voltage characteristics and current/stack-output characteristics, corresponding to the respective current/voltage characteristics of the fuel cell stack, accompanied by warm-up operation being executed, in the presently filed embodiment.

First, referring to the flowchart shown in FIG. 4 and the timing diagram shown in FIG. 5, detailed description is made of how start-up operation (in a warm-up mode) is executed in the vehicular fuel cell system of the presently filed embodiment.

The flowchart shown in FIG. 4 illustrates control operation of the fuel cell power plant controller 52, which responds to a start-up request, initiated by a key switch which is not shown, and begins to execute a start-up operation (at time T=0 as shown in FIG. 5) that proceeds to step S1.

In step S1, immediately after start-up of the fuel cell system, because the fuel cell power plant controller 52 and, more particularly, the run permission section 7 (see FIG. 1) are unable to determine whether the fuel cell stack 14 is available to supply electric power needed to cause the vehicle to travel the fuel cell power plant controller 52 turns off the vehicle run permission signal RSIG, and operation is routed to step S2.

In next step S2, the fuel cell power plant controller 52 and, more particularly, the warm-up output control section 8 (see FIG. 1) drive the coolant pump 35, thereby commencing circulation of coolant. Also, when this takes place, the three-way valve 34 controls the flow path of coolant such that coolant is circulated between the fuel cell stack 14 and the heat exchanger 18c of the combustor 18.

In succeeding step S3, the warm-up output control section 8 retrieves a detected value of the temperature sensor 36, thereby detecting a temperature Tso of coolant discharged from the coolant outlet manifold 14f.

In subsequent step S4, the warm-up output control section 8 determines whether the detected coolant temperature Tso is equal to or higher than a predetermined temperature Ts required for warming up the fuel cell stack 14, thereby making a judgment whether during start-up of the vehicle, the fuel cell stack 14 needs a warm-up operation. Incidentally, even though the temperature Ts depends upon a performance of the fuel cell stack 14, the warm-up output control section 8 determines that, since an output performance required for travel of the vehicle can be ensured in the presence of the coolant temperature Tso equal to or higher than the temperature Ts (in the vicinity of 20 [° C.]) at which there is surely no need for warm-up, there is no need for warm-up of the fuel cell system 14.

If the warm-up output control section 8 determines that the detected coolant temperature Tso is equal to or exceeds the temperature Ts necessary for warm-up of the fuel cell stack 14 and no need arises for warm-up of the fuel cell stack 14, the start-up operation proceeds to step S11. On the contrary, if the warm-up output control section 8 determines that the detected coolant temperature Tso remains less than the temperature Ts at which the fuel cell stack 14 needs to be warmed up, and there is a need for executing warm-up of the fuel cell stack 14, the warm-up start signal WSIG is delivered from the warm-up output control section 8 to the run permission section 7, the start-up operation proceeds to step S5.

In step S5, the warm-up output control section 8 detects the vehicle demanded power signal PSIG, representative of the demanded power, which is outputted from the vehicle controller 51. Incidentally, when this takes place, since no run permission signal PSIG is outputted from the run permission section 7 as a result of operation in step S1, no request for power required for the vehicle to travel is involved in the vehicle demanded power signal PSIG that involves only a request for power required for vehicle auxiliary devices to be driven, such as an air conditioner and a window defogger system. When this takes place, the operation in step S5 is completed, and the start-up operation is routed from step S5 to step S6.

In subsequent step S6, the warm-up output control section 8 calculates an airflow rate required for the fuel cell stack 14 to generate electric power at an amount demanded for driving the vehicle auxiliary devices. Incidentally, during a period in which the vehicle is inhibited from traveling, no probability occurs for the amount of electric power demanded for the fuel cell stack 14 to exceed a total value of the maximum electric power to be consumed by the auxiliary devices. Accordingly, the warm-up output control section 8 calculates the airflow rate necessary for electric power to be obtained at an amount approximately in the order of this total value (e.g., 10 [kW]).

In addition, the warm-up output control section 8 calculates the airflow rate necessary for the combustor 18 to remain at or below a predetermined combustion temperature by taking oxygen content, to be consumed for generation of electric power, into consideration. Due to the presence of the fuel cell stack 14 and the combustor 18 connected in series, the warm-up output control section 8 calculates a flow rate of air, to be discharged from the compressor 12, in order to realize the airflow rate that is needed for the fuel cell stack 14 and the combustor 18. When this takes place, the operation of step S6 is completed, and the start-up operation proceeds from step S6 to step S7.

In succeeding step S7, the warm-up output control section 8 controls the auxiliary devices 41a, 41b inside the fuel cell power plant controller 41 to cause the fuel cell stack 14 to be heated and warmed up. More particularly, the warm-up output control section 8 controls the rotational speed of the compressor 12 depending upon the requisite discharge airflow rate. Also, the warm-up output control section 8 turns on the electric-heated catalyst section 18a in response to a drop in the temperature of the electric-heated catalyst section 18a so that it is equal to or less than the predetermined temperature necessary for ignition in the combustor. Additionally, the warm-up output control section 8 controls the pressure control valves 17, 24, respectively, so as to allow air and hydrogen gas to remain in predetermined pressure levels, respectively. Moreover, the warm-up output control section 8 controls the purge valve 28, thereby controlling the flow rate of hydrogen gas to be supplied to the combustor 18. Additionally, the warm-up output control section 8 controllably drives the coolant pump 35 such that the heat exchanger 18c achieves heat exchange between the heat resulting from the catalytic combustor 18b and coolant to enable the fuel cell stack 14 to be heated with the resulting heat. When this takes place, the operation of step S7 is completed, and the start-up operation proceeds from step S7 to step S8.

In consecutive step S8, the run permission section 7 detects stack current Is and stack voltage Vs resulting in the fuel cell stack 14 using the current sensor 43a and the voltage sensor 43b, respectively. When this takes place, the operation in step S8 is completed, and the start-up operation proceeds from step S8 to step S9.

In next step S9, the run permission section 7 retrieves run available voltage Va [kW], in terms of detected stack current Is, referring to the current/voltage characteristics shown in FIG. 6, representative of the relationship between stack current Is and stack voltage (run available voltage or run permission voltage) at which the vehicle is available to travel. When this takes place, the operation in step S9 is completed, and the start-up operation proceeds from step S9 to step S10. Incidentally, the current/voltage characteristics shown in FIG. 6 is stored as a map in a memory, which is not shown, in the fuel cell power plant controller 52.

In consecutive step S10, the run permission section 7 determines whether detected stack voltage Vs is equal to or exceeds run available voltage Va, thereby determining whether the fuel cell stack 14 has been completely warmed up. If the detected stack voltage Vs is found to be less than run available voltage Va and the warm-up output control section 8 determines that the fuel cell stack 14 has not been completely warmed up, the run permission section 7 allows start-up operation to return to step S5. On the contrary, if the detected stack voltage Vs is found to be equal to or exceed run available voltage Va the warm-up output control section 8 determines that the fuel cell stack 14 has been completely warmed up and the run permission section 7 allows the start-up operation to proceed to step S11.

In succeeding step S11, the run permission section 7 outputs the run permission signal RSIG, permitting the vehicle to travel, to the vehicle controller 51 (at time T=T1 in FIG. 5). When this takes place, a series of start-up operations (in warm-up travel mode shown in FIG. 5) are completed and, thereafter, the fuel cell power plant controller 52 executes operation (in a normal travel mode as shown in FIG. 5) by which the fuel cell power plant 41 is controlled so as to generate electric power depending upon the demanded electric power at the amount required for the vehicle to travel. Incidentally, in FIG. 5, the output Ps [kW] of the fuel cell stack 14 represents certain electric power Psw [kW], before start-up during a warm-up and travel mode, and electric power Psn [kW] required for the vehicle to travel during a normal travel mode.

Concept of Start-Up Operation

Next, referring also to FIG. 7, detailed description is made of a concept of executing start-up operation set forth above. Incidentally, in FIG. 7, a left ordinate, a right ordinate and an abscissa represent stack voltage Vs [V], stack output Ps [kW] and stack current Is [A], respectively, and solid lines and broken lines represent current/voltage characteristics A, B, C of the fuel cell stack 14 and current/stack-output characteristics A', B', C' in terms of the respective current/voltage characteristics.

Further, the characteristics A, A', at which stack voltage and stack current take the lowest values, represent characteristics at an extremely low temperature (at minus twenty degrees) at which the fuel cell stack 14 needs to be warmed up; the characteristics B, B', at which stack voltage and stack current take next lower vales, represent characteristics with the temperatures at which the stack output value is available to provide the vehicle with run permission; and characteristics C, C', at which stack voltage and stack output value take the highest vales, represent characteristics with the temperature at which the maximum performance of the fuel cell stack is obtained.

Now, considering a case where immediately after the warm-up has begun, the fuel cell stack 14 exhibits the characteristics A, A', even if attempt is made to draw stack current Is from the fuel cell stack 14, a drop occurs in stack voltage Vs and, hence, it is hard to promptly obtain the stack output value Pr that enables run permission to be provided to the vehicle. Such a circumstance can be determined from the magnitudes in stack current Is and stack voltage Vs when generation of electric power Psw (in the order of approximately 10 [kW]) during warm-up operation and, in an exemplary case shown in FIG. 7, the fuel cell stack 14 merely operates at stack current Is =I1 and stack voltage Vs=V1 so as to obtain generated electric power Psw.

However, with the fuel cell stack 14 being progressively warmed up, stack voltage Vs gradually rises and, at the characteristics B, B', the fuel cell stack 14 is enabled to provide the stack output value Pr available to allow a run permission to be provided in the presence of stack current value remaining at Ir. Although stack current Is and stack voltage Vs for obtaining generated electric power Ps at the characteristics B can be generally expressed to lie at I2 and V2, respectively, run available voltage Va, associated with stack current Ir available to obtain the stack output Pr that enables run permission to be provided, lies at a value Vr.

Incidentally, although no need arises for retrieving run available voltage Va provided that generated electric power Ps during warm-up remains constant, a probability occurs in which generated electric power Ps varies depending upon the status of the auxiliary device during warm-up. Even in such a case, by retrieving run available voltage Va, associated with stack current Is, referring to the characteristics B, it is possible to correctly determine whether to provide the vehicle with a run permission.

As set forth above, with the structure of the presently filed embodiment, the fuel cell power plant controller 52 operates such that, when a determination is made that the fuel cell stack has reached a predetermined warmed-up condition based on the detected values in current and voltage of the fuel cell stack, during operation in which the fuel cell stack 14 is made operative to generate electric power to allow predetermined warm-up power output to be drawn during start-up of the fuel cell stack 14 at the low temperature, the fuel cell power plant controller 52 outputs the run permission signal, permitting the vehicle to travel, to the vehicle controller 51.

When this takes place, since the fuel cell power plant controller 52 is able to accurately determine that a situation occurs in which a stack output necessary for the vehicle to travel can be ensured, the fuel cell power plant controller 52 is able to correctly perform a judgment whether to permit the vehicle to travel, while minimizing a waste of time, needed before the vehicle commences to travel, and energy consumption.

Further, the fuel cell power plant controller 52 detects stack voltage Vs whereupon a determination is made such that the vehicle is available to travel when the stack voltage Vs equals or exceeds the predetermined value needed before the vehicle commences travel, resulting in the minimization of wasted time and energy consumption, and a simplified structure.

Furthermore, since the fuel cell power plant controller 52 is operative to determine a value of the voltage, based on which run permission is to be judged, depending upon the current value of generated electric power during warm-up, the fuel cell power plant controller 52 is able to correctly determine whether to permit the vehicle to travel even in the presence of transitions in generated electric power during warm-up.

Moreover, with the vehicular fuel cell system on which a secondary battery of a large capacity is specifically installed, since a large proportion of electric power required for the vehicle to travel can be backed by the secondary battery, it becomes possible for the vehicle to be suitably provided with run permission even at the low temperature condition where no electric power is generated by the fuel cell.

Additionally, with the fuel cell system using a fuel cell having a porous plate especially containing water, while warm-up continues to remove water at a below-freezing temperature, it becomes possible to obtain a fuel cell output that makes it possible to provide the vehicle with a run permission even in the course of thawing such ice.

In addition, with the fuel cell system using the fuel cell having such a porous plate, cathode exhaust gas and coolant outlet temperatures remain constant in the vicinity of 0 [° C.], in case of determining whether to provide the vehicle with run permission by detecting the temperature rise, the fuel cell system has no choice but to make decision under a condition where the cathode exhaust gas and coolant outlet temperatures exceed a value of 0 [° C.] (above 5 [° C.]). Consequently, with such a structure, in case where freezing occurs with water inside the porous plate at the below-freezing temperature, it is hard for the fuel cell system to provide the vehicle with run permission until ice is fully thawed and, hence, much time and energy are needed before the vehicle becomes available to travel. However, when applied with the structure of the presently filed embodiment, since the fuel cell system is able to accurately perform judgment whether to provide the vehicle with run permission even under a situation where cathode exhaust gas and coolant outlet temperatures remain constant in the vicinity of 0 [° C.], wasted time and energy consumption, required before the vehicle is permitted to run, can be minimized.

Second Embodiment

Figure 8:
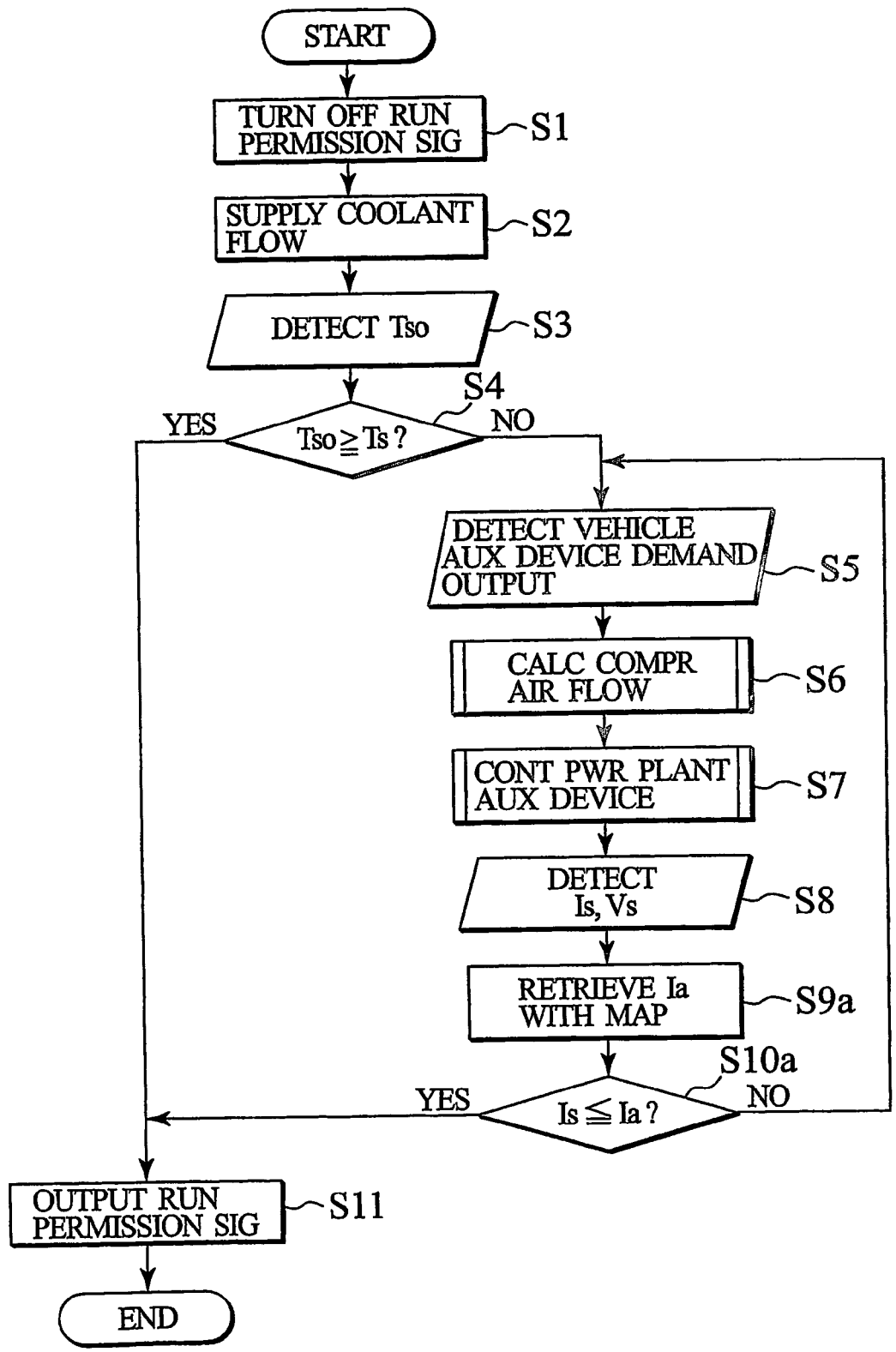
FIG. 8 is a flowchart illustrating a sequence of flows in start-up operation to be executed by a control device of a vehicular fuel cell system of a second embodiment according to the present invention.
Figure 9:
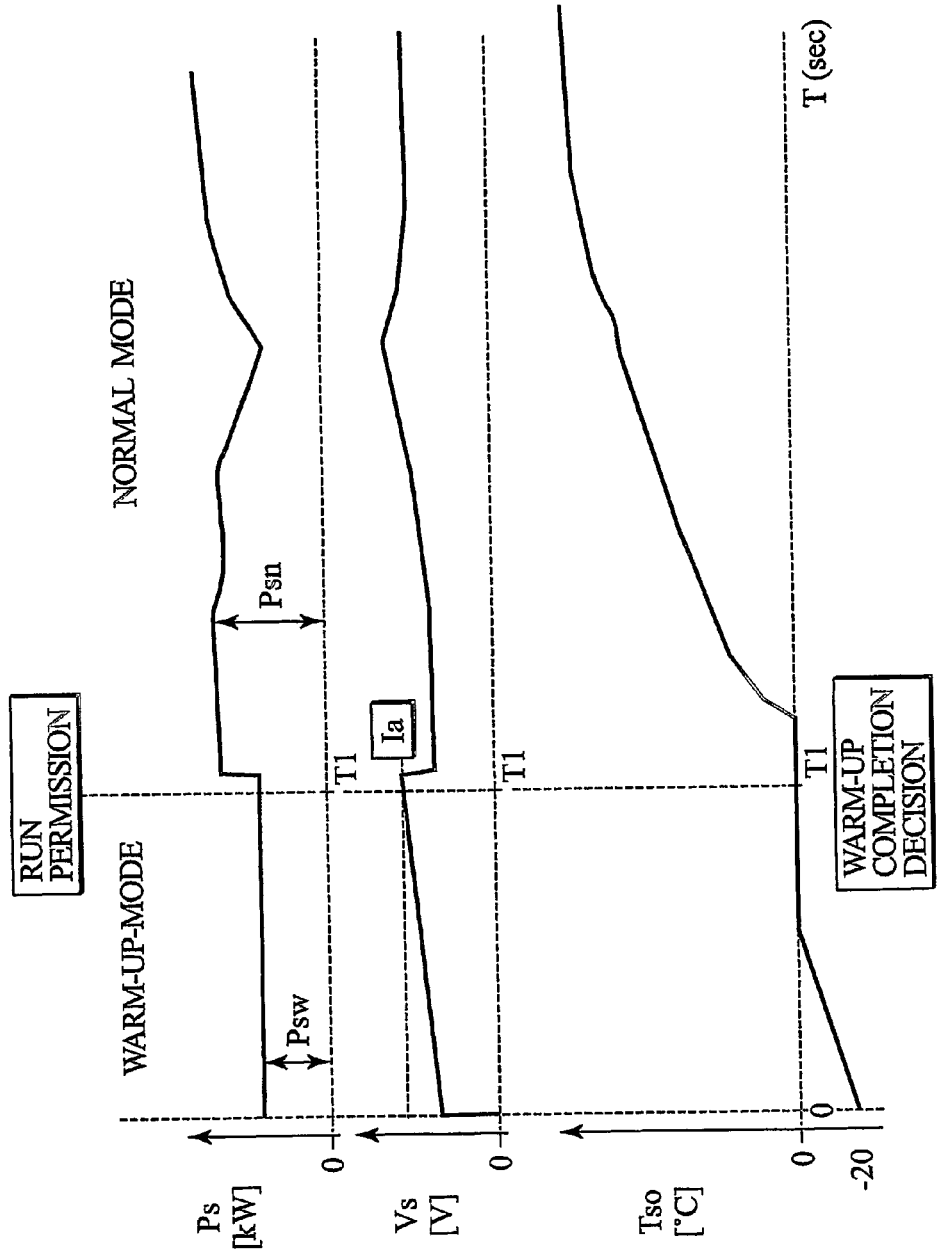
FIG. 9 is a timing chart illustrating variations in time of stack output, stack voltage and coolant temperature during execution of start-up operation shown in FIG. 8.
Figure 10:
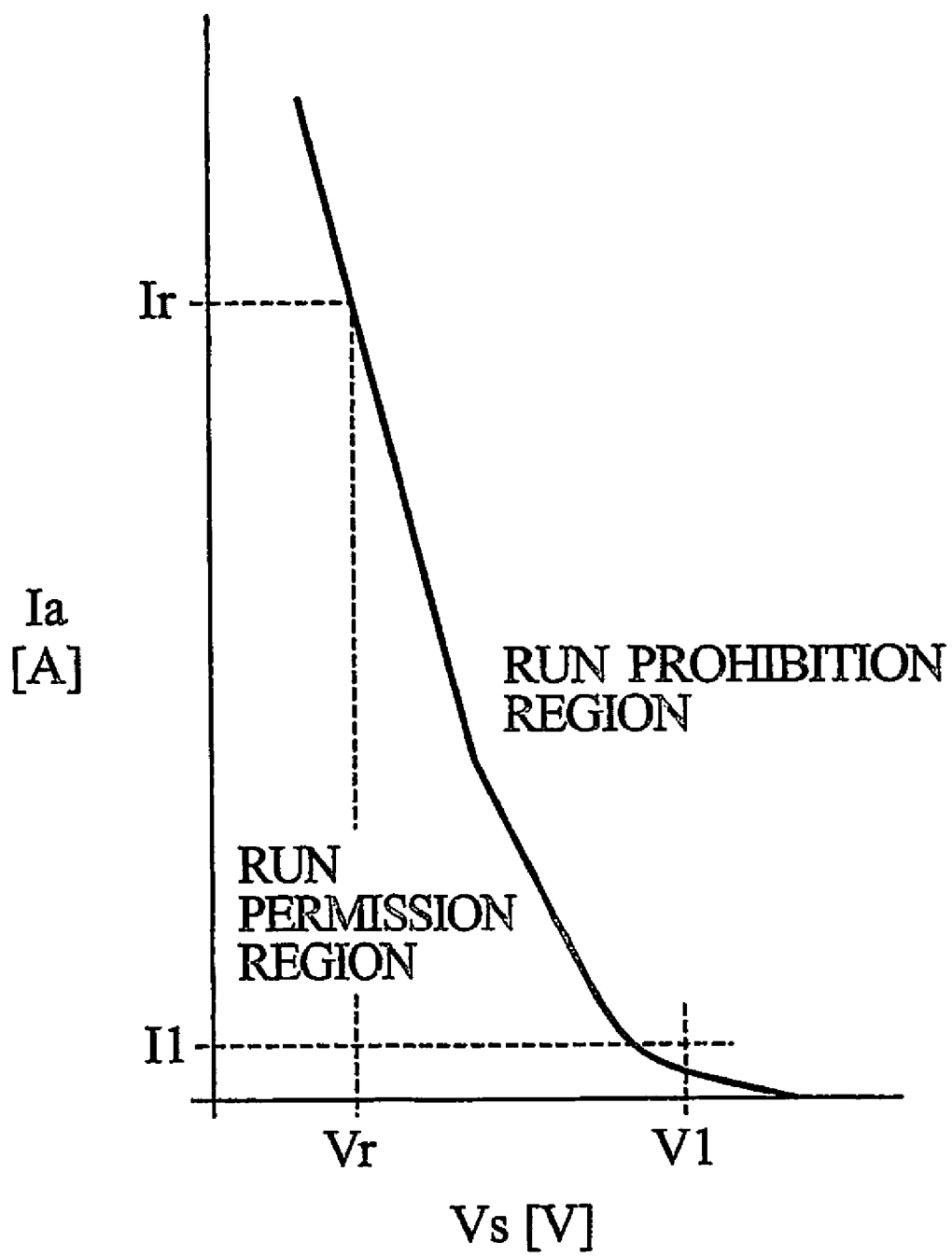
FIG. 10 is a view illustrating the relationship between stack voltage and run available current of the presently filed embodiment.

Now, referring to FIGS. 8 to 10, a detailed description is made of a control device of a vehicular fuel cell system and its related method of a second embodiment according to the present invention.

FIG. 8 is a flowchart showing the flow of start-up operation of a control device of a fuel cell system of the presently filed embodiment; FIG. 9 is a timing diagram illustrating variations in stack output, stack voltage and coolant temperature in terms of time during execution of start-up operation shown in FIG. 8; and FIG. 10 is a view illustrating the relationship between stack voltage and run available current of the presently filed embodiment. Also, start-up operation of the presently filed embodiment is executed in the same manner as that of the first embodiment shown in FIG. 1 except for operations in step S9 and step S10. Therefore, in the following description, description is mainly made of operations in step S9a and step S10a, associated with start-up operation of fuel cell system of the second embodiment, which correspond to step S9 and step S10, respectively, with remaining other steps being omitted or simplified in description. Also, the voltage/current characteristics shown in FIG. 10 serves as a map that is stored in a memory, which is not shown, in the fuel cell power plant controller 52.

As shown in FIG. 8, as a start-up operation in the presently filed embodiment is commenced and operation proceeds, operation in step S9a is commenced depending upon completion of operation in step S8.

In step S9a, the fuel cell power plant controller 52 retrieves a run available current Ia in terms of detected stack voltage Vs, referring to the current/voltage characteristics, shown in FIG. 10, representative of the relationship between stack voltage Vs and stack current (run available current or run permission current) Ia at which the vehicle is available to travel. When this takes place, operation of step S9 is completed, and start-up operation proceeds from step S9a to step S10a.

In subsequent step S10a, the fuel cell power plant controller 52 discriminates whether the detected stack current Is is equal to or less than run available current Ia, thereby making judgment whether the fuel cell stack 14 has been completely warmed up. If detected stack current Is is found to be equal to or less than run available current Ia and the warm-up of the vehicle is found to be completed, then, the fuel cell power plant controller 52 allows start-up operation to proceed to step S11. On the contrary, if detected stack current Is is found not to be equal to or less than run available current Ia and warm-up of the vehicle is found not to be completed, then, the fuel cell power plant controller 52 allows start-up operation to proceed to step S5. Incidentally, the reason why the determination whether fuel cell stack 14 has been completely warmed up is executed at a time when stack current Is becomes equal to or less than run available current Ia is that the presence of a drop occurring in electric current, required for obtaining the output Ps during warm-up, enables an increase in voltage to be discriminated.

As set forth above, with the structure of the presently filed embodiment, the fuel cell power plant controller 52 is operative to allow the fuel cell stack 14 to generate electric power such that warm-up electric power is available to be taken out at the predetermined amount during start-up of the fuel cell stack 14 under the low temperature condition while compelling the run permission signal, permitting the vehicle to travel, to be outputted to the vehicle controller 51 in response to the occurrence of the current/voltage characteristics of the fuel cell stack assuming a predetermined condition during a period in which warm-up electric power is drawn. When this takes place, since the fuel cell power plant controller 52 is able to accurately discriminate to find that a situation exists wherein stack output required for the vehicle to travel is ensured, the fuel cell power plant controller 52 is able to correctly perform a judgment whether to provide a run permission to the vehicle, while minimizing time and energy consumption that can result before the vehicle commences travel.

Further, since the fuel cell power plant controller 52 detects stack current Is resulting from predetermined electric power being generated and determines that the vehicle is available to travel, depending upon the occurrence of stack current Is remaining equal to or less than the predetermined value, a simplified structure is provided and it is possible to minimize time and energy consumption that result before the vehicle commences travel.

Furthermore, since the fuel cell power plant controller 52 is operative to determine a determining value of electric current, based on which run permission is to be judged, depending upon the voltage value resulting from electric power generated during warm-up, the fuel cell power plant controller 52 is able to accurately determine whether to allow the vehicle to be provided with run permission even in the presence of transitions in electric power during warm-up.

Incidentally, with the various embodiments set forth above, no limitation is intended by the present invention for the method of estimating stack current Is and stack voltage Vs and these factors may be estimated in other ways.

Further, in case where electric power generated by the fuel cell stack 14 during warm-up remains substantially constant, no run available voltage Va in terms of stack current Is may be retrieved, and run available voltage Va may be kept at a fixed value. Also, similarly, in case where electric power generated by the fuel cell stack 14 remains substantially constant during warm-up, no run available current Ia in terms of stack voltage Vs may be retrieved, and run available current Ia may be kept at a fixed value.

With the structure of the present invention set forth above, depending upon the voltage value or the current value of the fuel cell stack when taking out electric power from the fuel cell stack at an amount less than that a rated power output during warm-up of the fuel cell stack, a determination is made whether the fuel cell stack assumes a predetermined warm-up condition, and an advantageous effect resides in that warm-up completion decision can be accurately made based on the electrical characteristics of the fuel cell stack whereby time, before warm-up completion is decided, can be minimized and energy required for warm-up can be saved, thereby enabling a fuel saving performance of a fuel cell powered vehicle to be highly improved.

The entire content of a Patent Application No. TOKUGAN 2003-089089 with a filing date of Mar. 27, 2003 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

INDUSTRIAL APPLICABILITY

As set forth above, the control device of the vehicular fuel cell system of the present invention and its related method includes the structure that, while drawing a predetermined warm-up electric power by controlling the fuel cell stack to generate electric power when a fuel cell system is started up under a low temperature condition, and, in case that a fuel cell stack of the fuel cell system is warmed up, a vehicle of run permission is provided when a determination is made that the fuel cell stack assumes a predetermined warm-up condition by determining whether the fuel cell stack assumes the predetermined warm-up condition on the basis of one of a voltage value and an electric current value of the fuel cell stack. With such a structure, since a warm-up completion decision can be accurately conducted and the time before warm-up completion is decided can be minimized while enabling energy required for warm-up to be saved, the present invention is expected to have wide applications involving a fuel cell powered vehicle.

The invention claimed is:

1. A control device of a vehicular fuel cell system, comprising:
 a warm-up output control section configured, when the fuel cell system is started up under a low temperature condition necessary for warm-up of a fuel cell stack and when the fuel cell stack of the fuel cell system is warmed up, to cause the fuel cell stack to generate electric power to allow predetermined warm-up electric power to be drawn; and
 a run permission section configured to determine, during a period wherein the warm-up electric power is drawn by the warm-up output control section, whether the fuel cell stack assumes a predetermined warm-up condition on a basis of one of (1) a voltage value and (2) an electric current value of the fuel cell stack, wherein when a determination is made that the fuel cell stack assumes the predetermined warm-up condition, the run permission section is configured to provide a vehicle with a run permission,
 (1) when the voltage value of the fuel cell stack is equal to or more than a run available voltage value that is necessary before the vehicle may commence travel, wherein the run available voltage value is obtained from predetermined current/voltage characteristics showing a relationship between the electric current value of the fuel cell stack and the run available voltage value at a temperature at which an output value of the fuel cell stack is available to provide the vehicle with the run permission, or (2) when the electric current value of the fuel cell stack is equal to or less than a run available current value that is necessary before the vehicle may commence travel, wherein the nm available current value is obtained from predetermined current/voltage characteristics showing a relationship between the voltage value of the fuel cell stack and the run available current value at a temperature at which the output value of the fuel cell stack is available to provide the vehicle with the run permission.

2. The control device according to claim 1, wherein the run permission section provides the vehicle with the run permission when a temperature of coolant in the fuel cell stack is equal to or more than a predetermined value.

3. The control device according to claim 1, wherein when a temperature of coolant in the fuel cell stack is less than a predetermined value, the run permission section controls an auxiliary device which is provided to a power plant that includes the fuel cell stack so as to heat the fuel cell stack.

4. The control device according to claim 3, wherein the auxiliary device includes a combustor, wherein exhaust emitted from the fuel cell stack is introduced to the combustor.

5. The control device according to claim 4, wherein the combustor is provided with an electric-heated catalyst section operative to be heated to a catalytic active temperature by electric heat, a catalytic combustor section configured to combust the exhaust, and a heat exchanger configured to allow combustion heat of the exhaust to be transferred to the coolant.

6. A control device of a vehicular fuel cell system, comprising:
 a warm-up output controlling means, when the fuel cell system is started up under a low temperature condition necessary for warm-up of a fuel cell stack and when the fuel cell stack of the fuel cell system is warmed up, for controlling the fuel cell stack to generate electric power to allow predetermined warm-up electric power to be drawn; and
 a run permission providing means for providing a vehicle with a run permission when a determination is made that the fuel cell stack assumes a predetermined warm-up condition, wherein the run permission providing means is configured to determine whether the fuel cell stack assumes the predetermined warm-up condition on a basis of one of (1) a voltage value and (2) an electric current value of the fuel cell stack during a period wherein the warm-up electric power is drawn by the warm-up output controlling means,
 wherein the run permission providing means is configured to provide the vehicle with the run permission (1) when the voltage value of the fuel cell stack is equal to or more than a run available voltage value that is necessary before the vehicle may commence travel, wherein the run available voltage value is obtained from predetermined current/voltage characteristics showing a relationship between the electric current value of the fuel cell stack and the run available voltage value at a temperature at which an output value of the fuel cell stack is available to provide the vehicle with the run permission, or (2) when the electric current value of the fuel cell stack is equal to or less than a run available current value that is necessary before the vehicle may commence travel, wherein the run available current value is obtained from predetermined current/voltage characteristics showing a relationship between the voltage value of the fuel cell stack and the run available current value at a temperature at which the output value of the fuel cell stack is available to provide the vehicle with the run permission.

7. A method of controlling a vehicular fuel cell system, the method comprising:
 drawing a predetermined warm-up electric power by controlling a fuel cell stack to generate electric power when a fuel cell system is started up under a low temperature condition necessary for warm-up of the fuel cell stack and when the fuel cell stack of the fuel cell system is warmed up; and
 providing a vehicle with a run permission when a determination is made that the fuel cell stack assumes a predetermined warm-up condition, while determining whether the fuel cell stack assumes the predetermined warm-up condition on the basis of one of (1) a voltage value and (2) an electric current value of the fuel cell stack during a period in which the wane-up electric power is drawn,
 wherein the vehicle is provided with the ran permission (1) when the voltage value of the fuel cell stack is equal to or more than a run available voltage value that is necessary before the vehicle may commence travel, wherein the run available voltage value is obtained from predetermined current/voltage characteristics showing a relationship between the electric current value of the fuel cell stack and the run available voltage value at a temperature at which an output value of the fuel cell stack is available to provide the vehicle with the run permission, or (2) when the electric current value of the fuel cell stack is equal to or less than a run available current value that is necessary before the vehicle may commence travel, wherein the run available current value is obtained from predetermined current/voltage characteristics showing a relationship between the voltage value of the fuel cell stack and the run available current value at a temperature at which the output value of the fuel cell stack is available to provide the vehicle with the run permission.

* * * * *